United States Patent
Kruglick (10) Patent No.: US 9,298,502 B2
(45) Date of Patent: Mar. 29, 2016

(54) PAUSING VIRTUAL MACHINES USING API SIGNALING

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 202 days.

(21) Appl. No.: 14/110,132

(22) PCT Filed: Jan. 31, 2013

(86) PCT No.: PCT/US2013/024204
§ 371 (c)(1),
(2) Date: Oct. 4, 2013

(87) PCT Pub. No.: WO2014/120222
PCT Pub. Date: Aug. 7, 2014

(65) Prior Publication Data
US 2014/0325508 A1   Oct. 30, 2014

(51) Int. Cl.
*G06F 9/455* (2006.01)
*G06F 9/46* (2006.01)
*G06F 9/48* (2006.01)

(52) U.S. Cl.
CPC ........... *G06F 9/485* (2013.01); *G06F 9/455* (2013.01); *G06F 9/45533* (2013.01); *G06F 9/45558* (2013.01); *G06F 9/48* (2013.01); *G06F 9/4843* (2013.01); *G06F 9/4856* (2013.01); *G06F 9/4881* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 6,854,114 B1 | 2/2005 | Sexton et al. | |
| 2002/0073135 A1* | 6/2002 | Meyer | 709/107 |
| 2006/0020950 A1* | 1/2006 | Ladd et al. | 719/328 |
| 2006/0143350 A1 | 6/2006 | Miloushev et al. | |
| 2007/0156889 A1 | 7/2007 | Bhrara et al. | |
| 2007/0171921 A1 | 7/2007 | Wookey et al. | |
| 2008/0134177 A1* | 6/2008 | Fitzgerald et al. | 718/1 |
| 2009/0007100 A1* | 1/2009 | Field et al. | 718/1 |
| 2009/0276771 A1 | 11/2009 | Nickolov et al. | |
| 2009/0292654 A1 | 11/2009 | Katiyar et al. | |
| 2011/0265147 A1 | 10/2011 | Liu | |
| 2011/0296201 A1* | 12/2011 | Monclus et al. | 713/190 |
| 2012/0042034 A1* | 2/2012 | Goggin et al. | 709/216 |
| 2012/0047501 A1 | 2/2012 | Box et al. | |
| 2012/0054367 A1 | 3/2012 | Ramakrishnan et al. | |

(Continued)

OTHER PUBLICATIONS

"Computer multitasking", http://en.wikipedia.org/wiki/Computer_multitasking#Cooperative_multitasking.2Ftime-sharing, Created on Nov. 30, 2004.

(Continued)

*Primary Examiner* — Charles Swift
(74) *Attorney, Agent, or Firm* — Turk IP Law, LLC (57) ABSTRACT

Technologies are generally described for pausing virtual machines using API signaling. In some examples, active threads in a VM may be listed on a registered thread list. When the active threads in the VM perform external API calls, they may provide wait messages, which may then be compared with the registered thread list to determine if the VM should be paused. Subsequently, one or more replies to the external API calls may be received and used to determine if the VM should be reactivated.

18 Claims, 7 Drawing Sheets

(56) References Cited

U.S. PATENT DOCUMENTS

| | | | |
|---|---|---|---|
| 2012/0079479 A1* | 3/2012 | Hakewill | 718/1 |
| 2012/0089990 A1 | 4/2012 | Scheerer et al. | |
| 2012/0185913 A1 | 7/2012 | Martinez et al. | |
| 2012/0258722 A1* | 10/2012 | Liu | 455/450 |
| 2013/0054813 A1* | 2/2013 | Bercovici et al. | 709/226 |
| 2013/0160011 A1* | 6/2013 | Corrie | 718/1 |
| 2013/0219392 A1* | 8/2013 | Matsumoto et al. | 718/1 |
| 2013/0227553 A1* | 8/2013 | Tsirkin et al. | 718/1 |

OTHER PUBLICATIONS

Blelloch et al., "Multiscale Scheduling: Integrating Competitive and Cooperative", http://www.cs.cmu.edu/~rwh/papers/sched/desc.pdf, Created on Feb. 2007.

"Libtask: A Coroutine Library for C and Unix"; http://swtch.com/libtask/, retrieved on Jul. 16, 2013.

"Hardware-Assisted Virtualization Technology"; http://www.intel.com/technology/virtualization/technology.htm, retrieved on Jul. 16, 2013.

AMD "Pacifica" Virtualization Technology; http://www.slideshare.net/Cameroon45/amd-pacifica-virtualization-technology, p. 7 & 8, retrieved Jul. 19, 2013.

Biswas et al., "Hardware Virtualization Support in INTEL, AMD and IBM Power Processors,", International Journal of Computer Science and Information Security, vol. 4, Sep. 2009.

International Search Report and Written Opinion for PCT/US13/24204, filed Jan. 31, 2013, mailed Apr. 9, 2013.

"Amazon Elastic Compute Cloud (Amazon EC2)," accessed at https://web.archive.org/web/20130130042136/http://aws.amazon.com/ec2/, accessed on Mar. 25, 2015, pp. 9.

"Amazon SimpleDB," accessed at https://web.archive.org/web/20130130193717/http://aws.amazon.com/simpledb/, accessed on Mar. 25, 2015, pp. 5.

"Application delivery controller," accessed at https://web.archive.org/web/20120225234232/http://en.wikipedia.org/wiki/Application_delivery_controller, last modified on Sep. 26, 2011, pp. 3.

"Auto Scaling," accessed at https://web.archive.org/web/20130116055820/https://aws.amazon.com/autoscaling/, accessed on Mar. 25, 2015, pp. 2.

"Elastic Load Balancing," accessed at https://web.archive.org/web/20130116055738/https://aws.amazon.com/elasticloadbalancing/, accessed on Mar. 25, 2015, pp. 3.

"Programmable web," accessed at https://web.archive.org/web/20130130034752/http://www.programmableweb.com/, posted on Jan. 29, 2013, pp. 2.

"Understanding Memory Resource Management in VMware ESX 4.1," Performance study, pp. 1-25 (2010).

"VMware vSphere Hypervisor," accessed at https://web.archive.org/web/20130124200708/http://www.vmware.com/products/vsphere-hypervisor/overview.html, accessed on Mar. 25, 2015, pp. 1.

Banerjee, R., "Elastic Load Balancing in Amazon Compute Cloud," Master's Thesis, Harvard University, pp. 1-71 (Mar. 2011).

Barrett, R., "Transactions Across Datacentres," Special Lecture Series in Computer Science, pp. 1-8 (Feb. 12, 2009).

Fogarty, K., "How Many Virtual Machines Fit on Your Server? Planning Tips," accessed at https://web.archive.org/web/20100204081410/http://www.cio.com/article/527257/How_Many_Virtual_Machines_Fit_on_Your_Server_Planning_Tips?, posted on Jan. 29, 2010, pp. 4.

Hammond, E., "Running EC2 Instances on a Recurring Schedule with Auto Scaling," accessed at https://web.archive.org/web/20130117004651/http://alestic.com/2011/11/ec2-schedule-instance, posted on Nov. 15, 2011, pp. 4.

Mei, Y., et al., "Performance Analysis of Network I/O Workloads in Virtualized Data Centers," IEEE Transactions on Services Computing, vol. 6, Issue 1, pp. 1-16 (2011).

Ryu, K.D., and Hollingsworth, J. K., "Exploiting fine-grained idle periods in networks of workstations," IEEE Transactions on Parallel and Distributed Systems, vol. 11, Issue 7, pp. 683-698 (Jul. 2000).

* cited by examiner

PAUSING VIRTUAL MACHINES USING API SIGNALING

CROSS-REFERENCE TO RELATED APPLICATION

This Application is the National Stage filing under 35 U.S. §371 of PCT Application Ser. No. PCT/US13/24204 filed on Jan. 31, 2013. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Cloud-based low-level services are becoming widely available across the Internet. As a result, many computing architectures may combine these services to construct powerful datacenter applications. However, this may result in latency disparities between different operations, especially between operations that occur within a datacenter and operations that occur across different datacenters. For example, intra-datacenter operation latencies may range from nanoseconds to tens of milliseconds, whereas inter-datacenter operation latencies may be on the order of hundreds of milliseconds.

SUMMARY

The present disclosure generally describes techniques for pausing virtual machines using application programming interface (API) signaling.

According to some examples, a method is provided for pausing a virtual machine (VM) using API signaling. The method may include receiving a wait message from at least one active thread in the VM performing an external API call, pausing the VM based on the received wait message, receiving a reply to the external API call, and determining whether the VM should be reactivated based on the reply.

According to other examples, a virtual machine manager (VMM) is provided for pausing a virtual machine using API signaling in a datacenter. The VMM may include an external API detection module and a processing module. The external API detection module may be configured to receive a reply to an external API call performed by at least one active thread in the VM. The processing module may be configured to receive a wait message from the at least one active thread in the VM, pause the VM based on the received wait message, and determine whether the VM should be reactivated based on the reply.

According to further examples, a cloud-based datacenter configured to pause virtual machines using API signaling is provided. The datacenter may include at least one VM operable to be executed on one or more physical machines and a datacenter controller. The datacenter controller may be configured to receive a wait message from at least one active thread in the VM performing an external API call, pause the VM based on the received wait message, receive a reply to the external API call, and determine whether the VM should be reactivated based on the reply.

According to some examples, a computer readable medium may store instructions for pausing a virtual machine using API signaling. The instructions may include receiving a wait message from at least one active thread in the VM performing an external API call, pausing the VM based on the received wait message, receiving a reply to the external API call, and determining whether the VM should be reactivated based on the reply.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to pausing virtual machines (VMs) using application programming interface (API) signaling.

Briefly stated, technologies are generally described for pausing virtual machines using API signaling. In some examples, active threads in a VM may be listed on a registered thread list. When the active threads in the VM perform external API calls, they may provide wait messages, which may then be compared with the registered thread list to determine if the VM should be paused. Subsequently, one or more replies to the external API calls may be received and used to determine if a paused VM should be reactivated.

Figure 1:
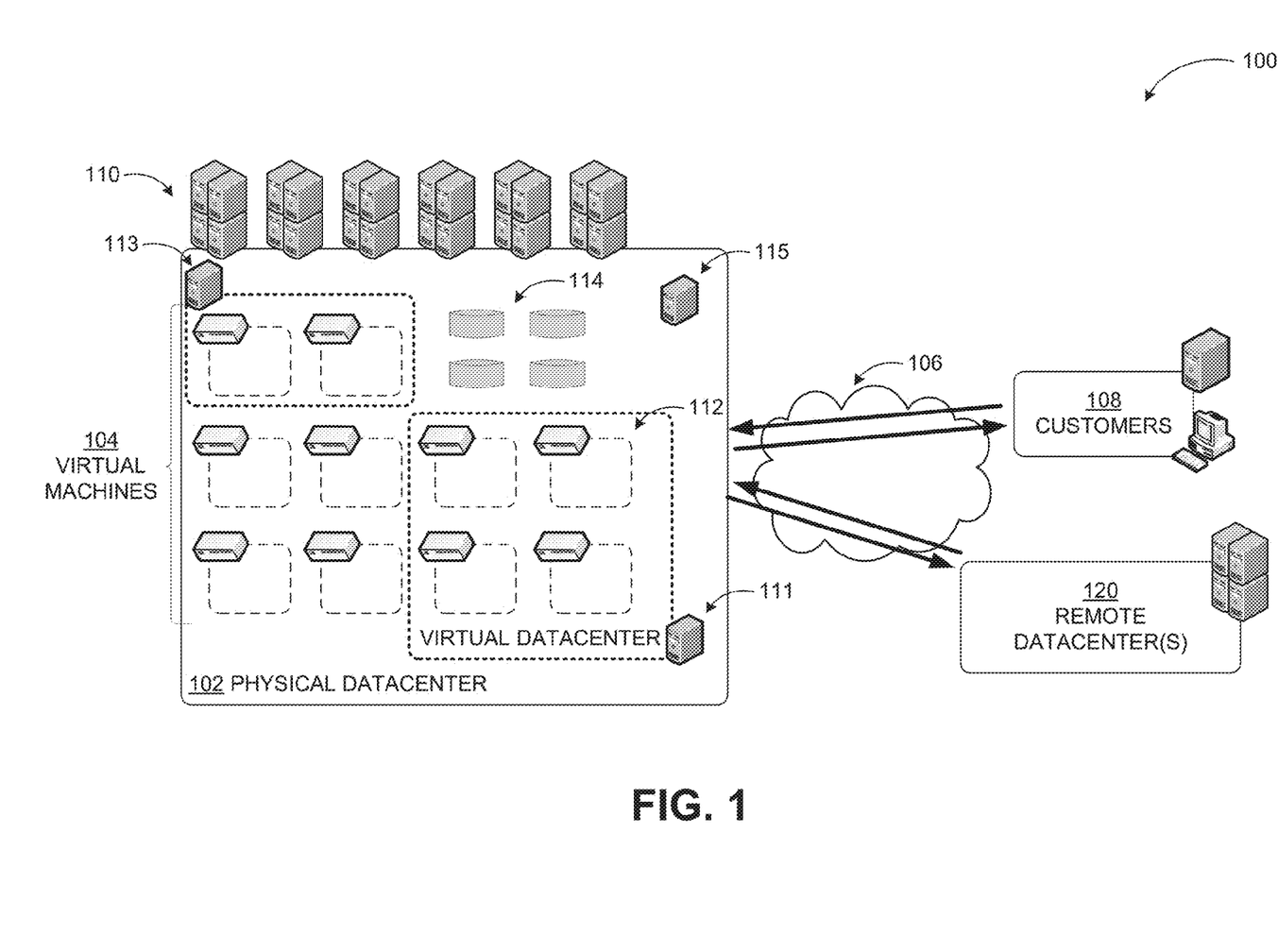
FIG. 1 illustrates an example datacenter-based system where virtual machine pausing using API signaling may be implemented.

FIG. 1 illustrates an example datacenter-based system where virtual machine pausing using API signaling may be implemented, arranged in accordance with at least some embodiments described herein.

As shown in a diagram 100, a physical datacenter 102 may include one or more physical servers 110, 111, and 113, each of which may be configured to provide one or more virtual machines (VMs) 104. For example, the physical servers 111 and 113 may be configured to provide four VMs and two VMs, respectively. In some embodiments, one or more VMs may be combined into one or more virtual datacenters. For example, the four VMs provided by the physical server 111 may be combined into a virtual datacenter 112. The VMs 104 and/or the virtual datacenter 112 may be configured to provide cloud-related data/computing services such as various applications, data storage, data processing, or comparable ones to a group of customers 108, such as individual users or enterprise customers, via a cloud 106.

Figure 2:
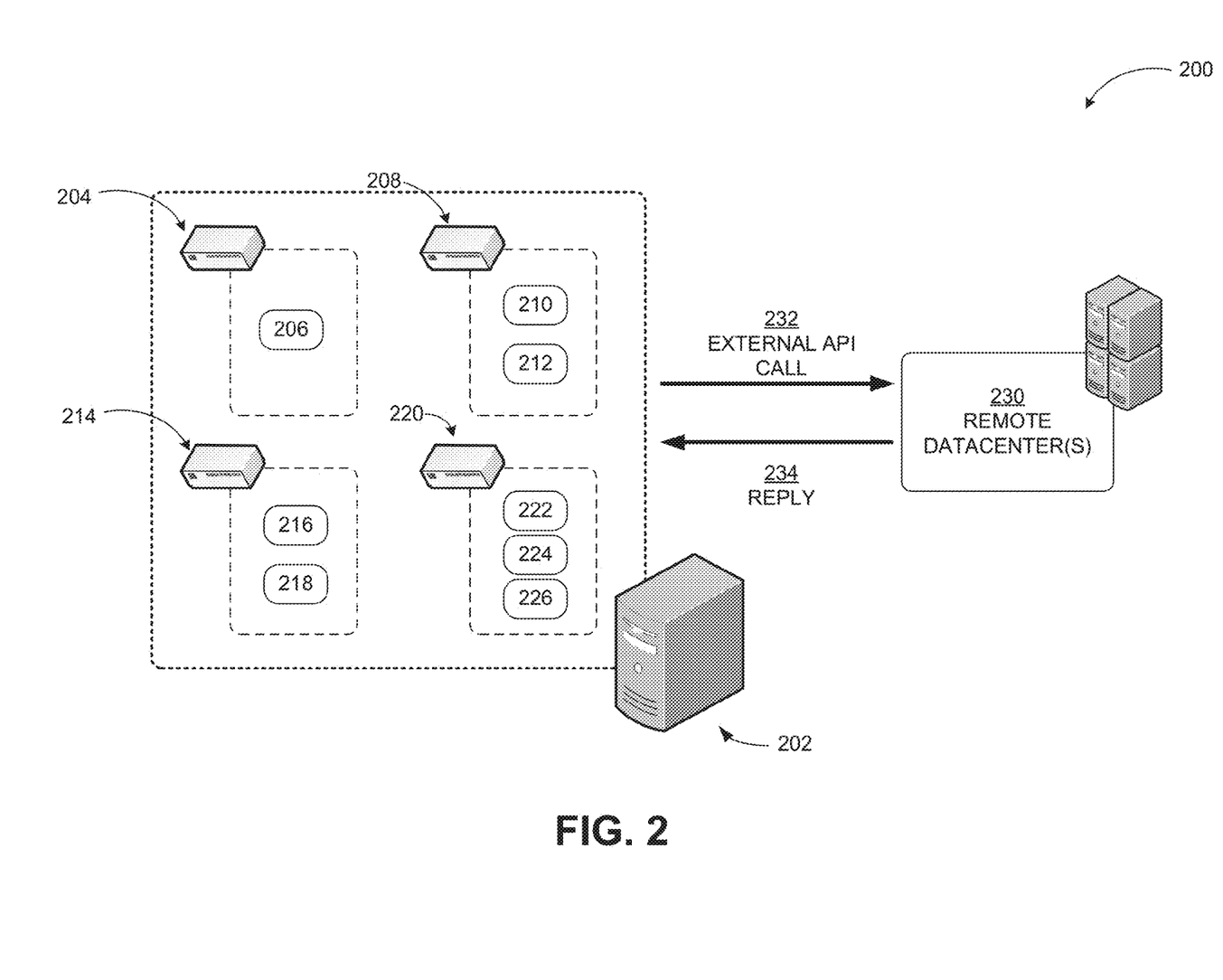
FIG. 2 illustrates an example datacenter-based system where the same datacenter hardware may execute multiple virtual machines, and threads executing on the virtual machines may make external API calls.

FIG. 2 illustrates an example datacenter-based system where the same datacenter hardware may execute multiple VMs, and threads executing on the VMs may make external API calls, arranged in accordance with at least some embodiments described herein.

As shown in a diagram 200, multiple VMs 204, 208, 214, and 220 may operate on a single physical server 202 (similar to the physical server 111 in FIG. 1). Each of the VMs 204, 208, 214, and 220 may be configured to execute one or more threads. For example, a thread 206 may execute on the VM 204, threads 210 and 212 may execute on the VM 208, threads 216 and 218 may execute on the VM 214, and threads 222, 224, and 226 may execute on the VM 220. In some embodiments, the physical server 202 may be configured to implement the multiple VMs by rapidly switching its hardware between the VMs. For example, the physical server 202 may implement the VM 204 (and execute its associated thread 206) at one time, then rapidly switch to another VM and execute its associated threads. In this way, the hardware of the physical server 202 may be shared between the different VMs (and associated threads). In some embodiments, a Virtual Machine Manager 'VMM' (also called a hypervisor) may be responsible for implementing exactly how VMs are switched.

As mentioned above, some applications may be formed by combining low-level services from across a wide area network such as the Internet. In cases where the low-level services are distributed across different datacenters, external application programming interface (API) calls and replies may be used to tie the different services together. For example, one or more of the threads in the VMs 204, 208, 214, and 220 may perform an external API call 232 to a remote datacenter 230 to invoke some functionality provided by the remote datacenter 230. Subsequently, the remote datacenter 230 may provide a reply 234 to the external API call 232. However, since inter-datacenter communications may have latencies on the order of hundreds of milliseconds or more, the thread that performs the external API call 232 may have to wait for a significant period of time before the reply 234 to the external API call 232 is received. In the meantime, the thread may not be able to continue processing without the data included in the reply 234. As a result, any processing time spent on the thread (or the included VM) after the external API call 232 but before the reply 234 is received may be wasted.

Intra-datacenter VM pausing and switching may be used to alleviate this issue. As discussed above, intra-datacenter operations (e.g., VM switching) may take less time than inter-datacenter operations (e.g., external API calls and replies). For example, VM switching within a datacenter may have latencies on the order of nanoseconds, whereas inter-datacenter communications may have latencies on the order of hundreds of milliseconds. Therefore, it may be desirable to pause a VM awaiting one or more replies (and therefore unable to continue processing) in order to switch to another VM, thereby recovering processing time that may be wasted by waiting for the replies.

While the examples provided in this disclosure describe pausing VMs using API signaling, in other embodiments VMs may also be paused while performing intra-datacenter operations, especially those with significantly higher latencies than VM switching. For example, disk access operations, while generally lower latency than inter-datacenter signaling, may still have higher latency than VM switching.

Figure 3:
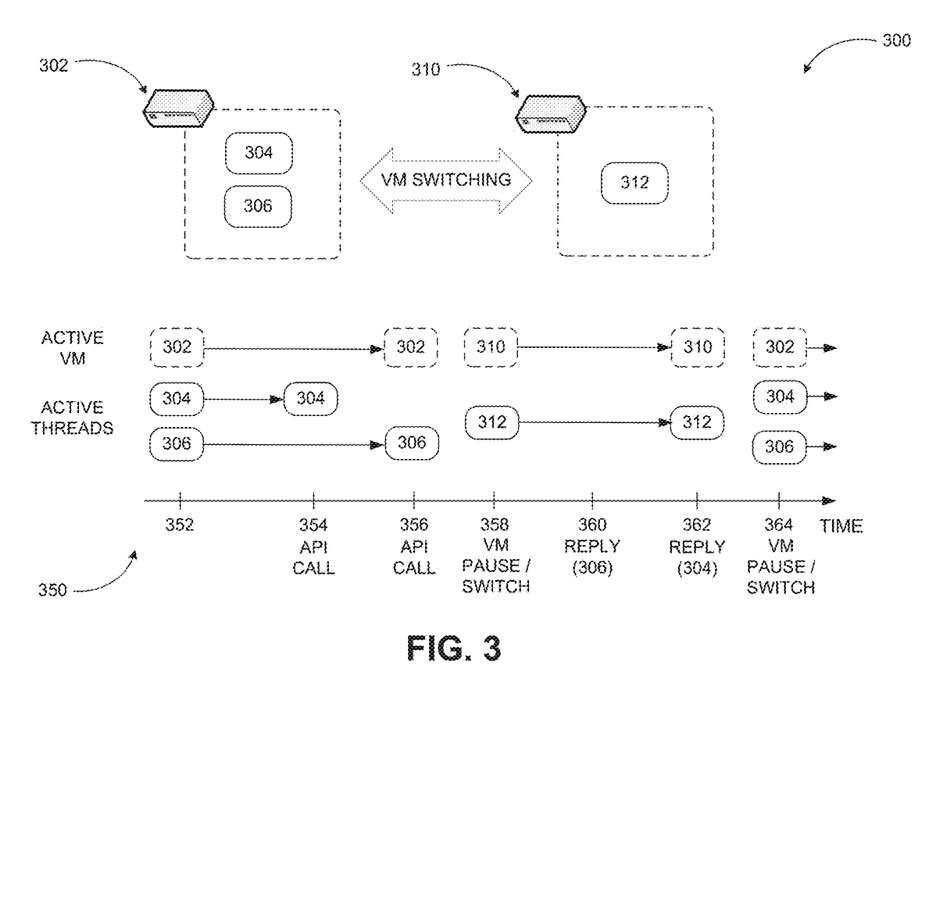
FIG. 3 illustrates the operation of an example system implementing virtual machine pausing using API signaling may be implemented.

FIG. 3 illustrates the operation of an example system implementing virtual machine pausing using API signaling may be implemented, arranged in accordance with at least some embodiments described herein.

As shown in a diagram 300, a VM 302 and a VM 310 may be configured to execute on the same physical hardware (e.g., the physical server 202 in FIG. 2). The VM 302 may execute threads 304 and 306 when active, and the VM 310 may execute a thread 312 when active. The physical hardware may be configured to switch between the VM 302 and the VM 310. A timing chart 350 may depict the particular VM and threads that are active and/or being executed at a particular time. For example, at a time 352, VM 302 may be active, and threads 304 and 306 may be active.

At a subsequent time 354, the thread 304 may perform an external API call and await a reply before continued processing. In some embodiments, the thread 304 may provide a wait message to a VMM associated with the physical hardware. The VMM may use the wait message to determine if a VM (e.g., the VM 302) should be paused in order to switch to another VM.

At the time 354, the VMM may determine that the VM 302 should not be paused, because the VM 302 includes an active thread (i.e., the thread 306) still processing. However, at a subsequent time 356, the thread 306 may also perform an external API call and provide a wait message to the VMM. The VMM may then determine that the VM 302 should be paused, pause the VM 302 at or soon after the time 356, and switch to the VM 310 at a time 358. In some embodiments, pausing a VM may include idling or deactivating the VM.

Subsequently, at a time 360, a reply to the external API call made by the thread 306 may be received. The VMM may use the reply to determine if a paused VM (e.g., the VM 302) should be reactivated. In this particular case, the VMM may determine that the paused VM 302 should not be reactivated at the time 360, even though the reply was received for one of its threads. For example, the VMM may make this determination because replies have not been received for all of the paused VM's threads that are awaiting replies. However, in other embodiments the VMM may determine that a paused VM should be reactivated even if replies have not been received for all of its threads awaiting replies. For example, the determination may be based on a pre-determined number or percentage/proportion of threads with received replies and/or one or more importance values associated with a thread and/or reply. Since the paused VM 302 is not reactivated at the time 360, the VMM may store the received reply.

Later, at a time 362, a reply to the external API call made by the thread 304 may be received. The VMM may then determine that the paused VM 302 should be reactivated. The VM 310 and its active thread 312 may then be halted (or paused), and the paused VM 302 and its threads 304 and 306 reactivated.

Figure 4:
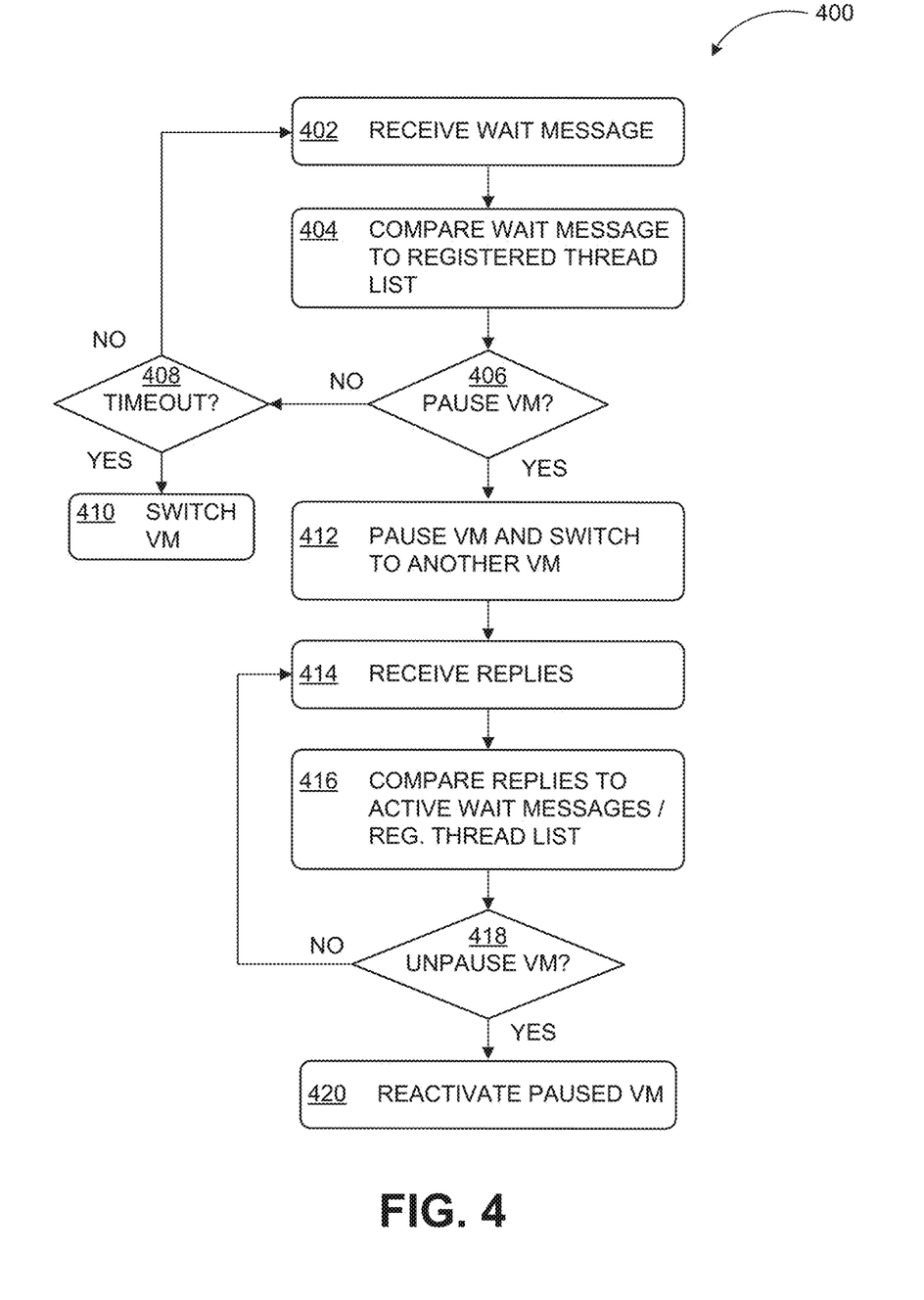
FIG. 4 illustrates an example process for implementing virtual machine pausing using API signaling.

FIG. 4 illustrates an example process for implementing VM pausing using API signaling, arranged in accordance with at least some embodiments described herein.

As depicted in a diagram 400, a process for implementing VM pausing using API signaling may begin with operation 402, in which a wait message is received from an active thread (e.g., the active threads 304 or 306 in FIG. 3) by, for example, a virtual machine manager. The active thread may send the wait message after performing an external API call (e.g., the external API call 232 in FIG. 2). In some embodiments, the active thread may send the wait message while performing the external API call or even slightly before it performs the external API call. The wait message may include a time when the external API call was (or will be) performed and/or a maximum time that the active thread or the VM with the active thread should be paused before reactivation. In some embodiments, the wait message may also include a way to recognize a reply to the external API call, such as an origin address, the content of the reply, and/or reply meta-data.

Subsequently, at operation 404, the virtual machine manager may compare the received wait message with a registered thread list. A registered thread list may be used to determine which threads and/or VMs participate in VM pausing. For example, users who wish to take advantage of VM pausing may configure their VMs and/or threads to register themselves in the registered thread list upon startup. Having such a list may allow users to decide if they want to use VM pausing. In some embodiments, the datacenter may provide incentives for users of VM pausing. For example, the datacenter may provide discounts on processing time and/or promise that average VM resources will remain the same, essentially providing more processing for the same price. In other realizations, the registered thread list may be assembled by the VMM or may simply consider each VM as an entity for pausing purposes.

At next operation 406, the virtual machine manager may determine if the VM with the thread that sent the wait message should be paused. For example, if the received wait message corresponds to an active thread on the registered thread list, then other parameters may be used to determine if the VM should be paused. In some embodiments, a VM may not be paused unless a pre-specified number of active threads in the VM (up to and including all active threads in the VM) have already provided wait messages (i.e., have made external API calls and are awaiting replies).

If the virtual machine manager determines that the VM should not be paused, then at next operation 408 the virtual machine manager may determine if the VM has timed out. If not, the process may restart at operation 402. If the VM has timed out, then at operation 410, a VM switch occurs, without pausing the VM. On the other hand, if it is determined that the VM should be paused, at next operation 412 the virtual machine manager may pause the VM and switch to another VM.

Subsequently, at operation 414, the virtual machine manager may receive one or more replies in response to the external API calls made previously. At operation 416, the virtual machine manager may compare the received replies with the active wait messages and/or the registered thread list. For example, the received replies may be compared to wait message information (e.g., an origin or destination address, reply content, meta-data, etc.) to determine their destination thread(s).

Based on the comparison performed in operation 416, in subsequent operation 418 it the virtual machine manager may determine if the VM should be unpaused. For example, a VM may not be unpaused until a pre-specified number of replies (up to and including replies corresponding to all outstanding wait messages for the VM) have been received. In some embodiments, importance values associated with one or more of the replies may be used to determine whether the VM should be unpaused. For example, if a number of replies below a pre-specified number are received, and all the replies have relatively low importance values, then the VM may not be unpaused. However, if at least one of the replies has a relatively higher importance values, then the VM may be unpaused. Importance values may be binary (i.e., important or not) or have more values (e.g., values between 0 and 5, inclusive). In some embodiments, a time threshold may also be used to determine if the VM should be reactivated. For example, if the time since the VM was first paused exceeds the time threshold, the VM may be reactivated regardless of whether a sufficient number of replies and/or important replies have been received. The time threshold may be set by the system (e.g., the virtual machine manager) or by the wait message (e.g., as described above in relation to operation 402).

If at operation 418 the virtual machine manager determines that the VM should not be unpaused or reactivated, then the process continues to operation 414, where more replies may be received. Any replies received previously may be buffered or stored in memory until the VM is reactivated. On the other hand, if at operation 418 it is determined that the VM should be unpaused, then at next operation 420 the virtual machine manager may reactivate the paused VM (and its threads). When the paused VM is reactivated, the other VM may be halted or paused.

Figure 5:
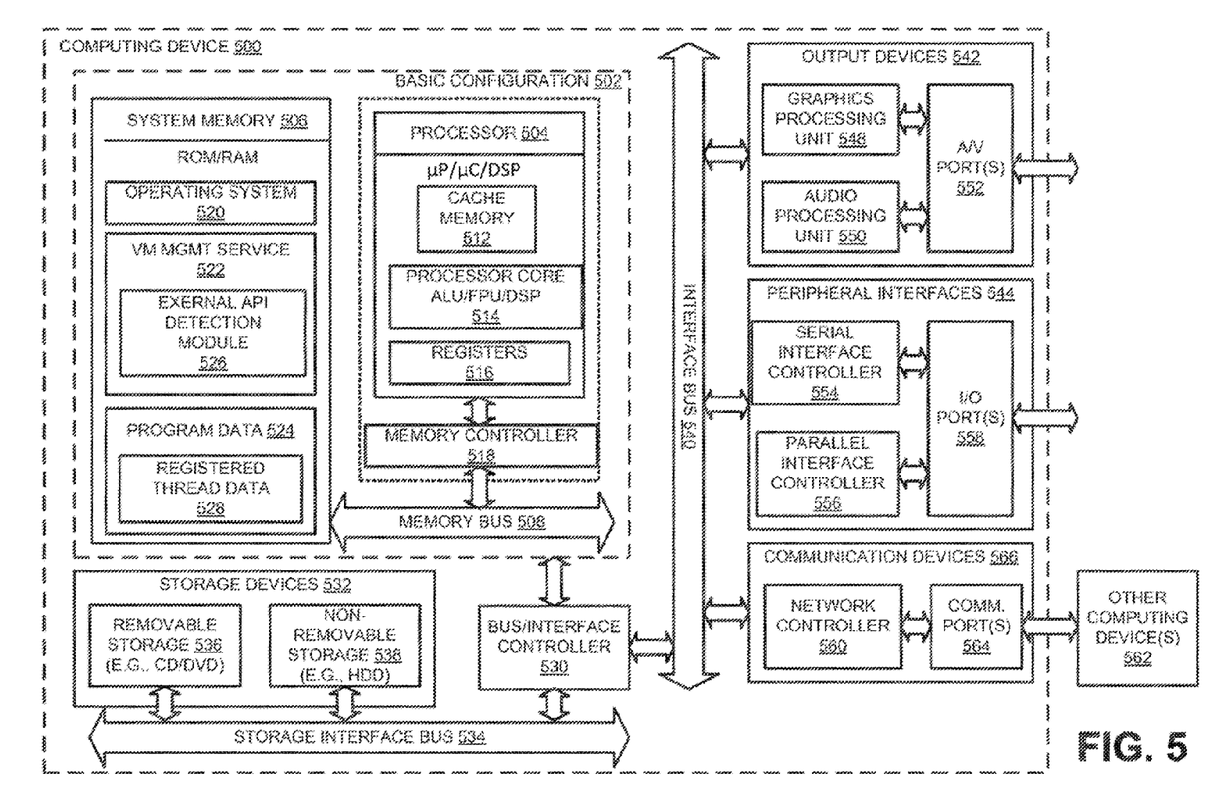
FIG. 5 illustrates a general purpose computing device, which may be used to pause virtual machines using API signaling.

FIG. 5 illustrates a general purpose computing device, which may be used to pause VMs using API signaling, arranged in accordance with at least some embodiments described herein.

For example, the computing device 500 may be used to implement VM pausing using API signaling as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a VM management service 522, and program data 524. The VM management service 522 may include an external API detection module 526 for detecting replies to external API calls as described herein. The program data 524 may include, among other data, registered thread data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more AN ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for pausing VMs using API signaling. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
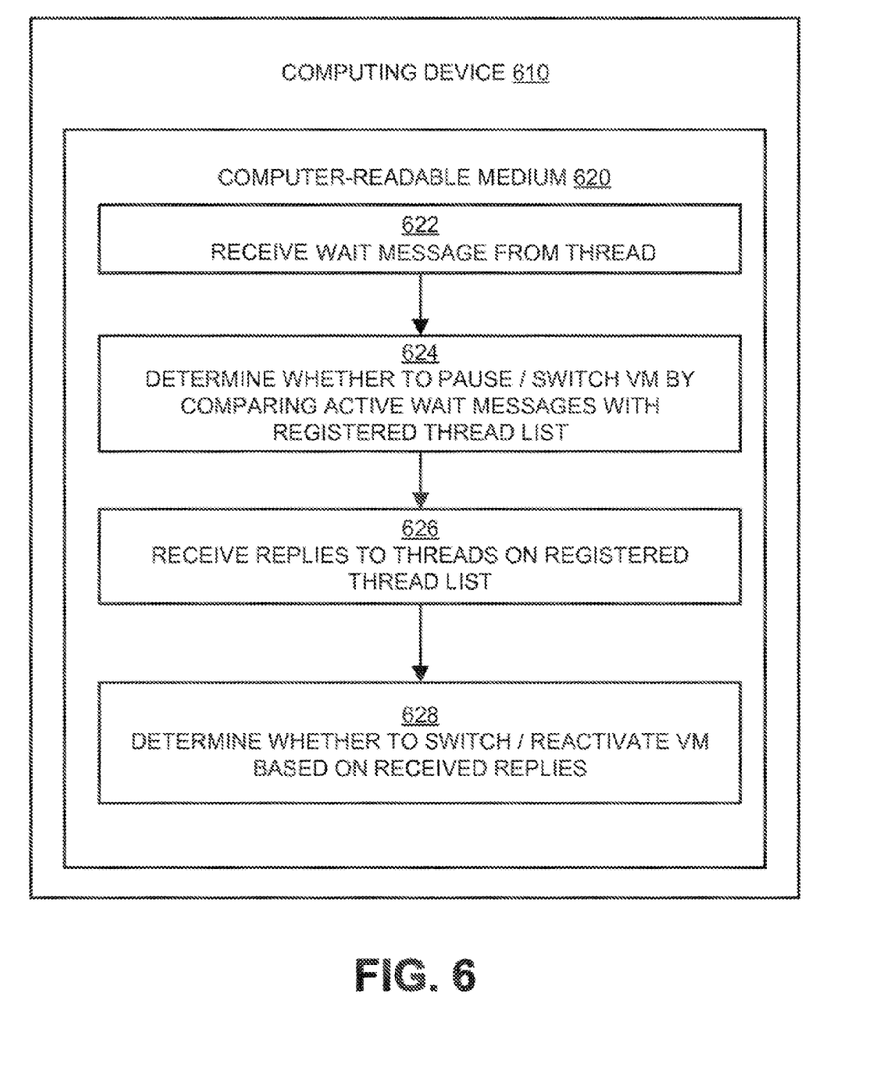
FIG. 6 is a flow diagram illustrating an example method for pausing virtual machines using API signaling that may be performed by a computing device such as the computing device in FIG. 5.

FIG. 6 is a flow diagram illustrating an example method for pausing virtual machines using API signaling that may be performed by a computing device such as the computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for pausing VMs using API signaling may begin with block 622, "RECEIVE WAIT MESSAGE FROM THREAD", where one or more wait messages may be received by, e.g., a virtual machine manager such as the VM management service 522 in FIG. 5, from one or more active threads in a VM, as described above in reference to the operation 402. For example, wait messages may be received from active threads when they perform external API calls.

Block 622 may be followed by block 624, "DETERMINE WHETHER TO PAUSE/SWITCH VM BY COMPARING ACTIVE WAIT MESSAGES WITH REGISTERED THREAD LIST", where the wait messages received in block 622 may be used to determine if the VM should be paused, as described above in relation to the operations 404, 406, and 412 in FIG. 4. For example, a virtual machine manager (e.g., the VM management service 522 in FIG. 5) may make the determination of whether the VM should be paused based on the number of wait messages already received, and whether the threads sending the wait messages are on a registered thread list.

Block 624 may be followed by block 626, "RECEIVE REPLIES TO THREADS ON REGISTERED THREAD LIST", where after the VM has been paused, one or more replies to external API calls performed by active threads on the registered list may be received by, for example, the external API detection module 526 in FIG. 5, as described above in relation to the operation 414 in FIG. 4.

Finally, block 626 may be followed by block 628, "DETERMINE WHETHER TO SWITCH/REACTIVATE VM BASED ON RECEIVED REPLIES", where the received replies may be used to determine if a VM should be unpaused/reactivated, as described above in relation to the operations 414, 416, and 418 in FIG. 4. For example, a virtual machine manager (e.g., the VM management service 522 in FIG. 5) may make the determination of whether the VM should be reactivated based on the number of received replies and/or the importance of the received replies.

Figure 7:
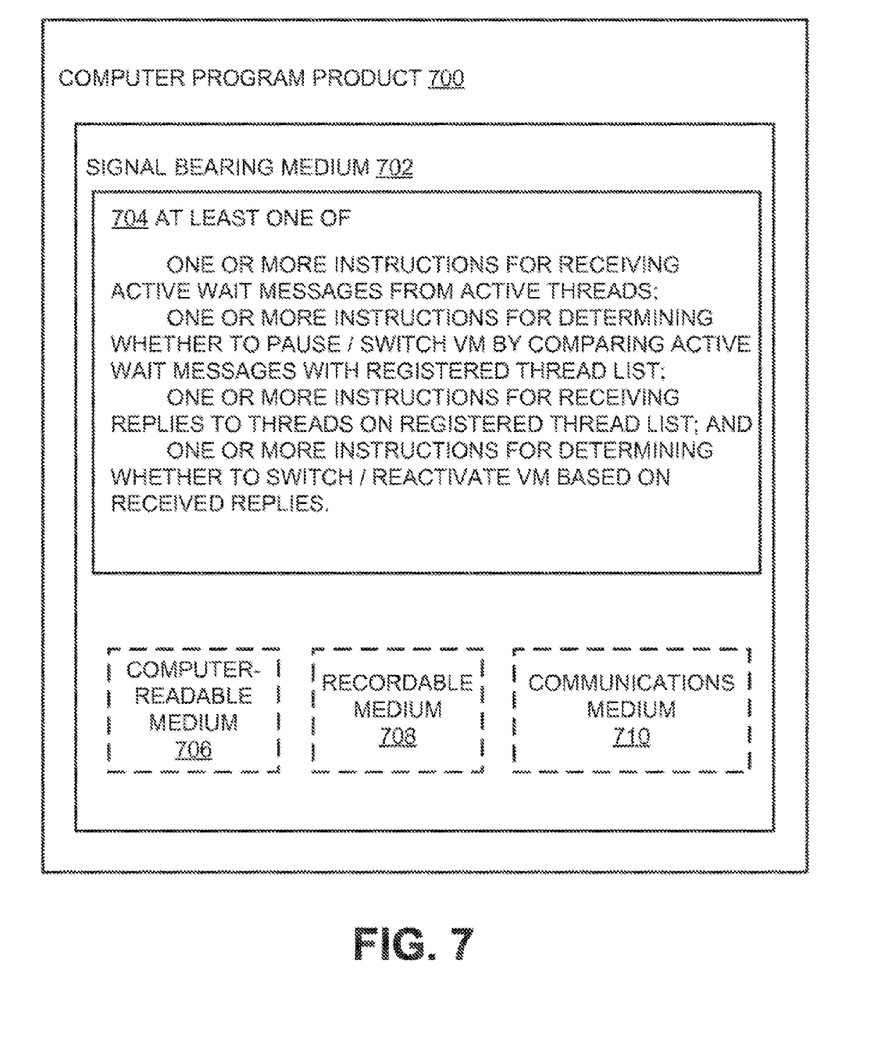
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the VM management service 522 may undertake one or more of the tasks shown in FIG. 7 in response to the instructions 704 conveyed to the processor 504 by the signal bearing medium 702 to perform actions associated with pausing VMs using API signaling as described herein. Some of those instructions may include, for example, receiving active wait messages from active threads, determining whether to pause/switch a VM by comparing active wait messages with a registered thread list, receiving replies to threads on the registered thread list, and/or determining whether to switch/reactivate a VM based on the received replies, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method for pausing a virtual machine (VM) using application programming interface (API) signaling at a datacenter may include receiving a wait message from at least one active thread in the VM performing an external API call, pausing the VM based on the received wait message, receiving a reply to the external API call, and determining whether the VM should be reactivated based on the reply.

According to some embodiments, the method may further include receiving the reply to the external API call from a remote datacenter. The method may further include switching to another VM when the VM is paused, switching from the other VM responsive to a determination that the VM should be reactivated, and/or pausing the other VM if the VM is reactivated.

According to other embodiments, the method may further include receiving wait messages from multiple active threads in the VM and pausing the VM based on the multiple received wait messages. The wait messages may be received from all active threads in the VM or a pre-specified number of active threads in the VM. The method may further include receiving replies to multiple external API calls performed by multiple active threads in the VM and determining if the VM should be reactivated based on the replies. Replies to all or a pre-specified number of external API calls performed by the multiple active threads in the VM may be received, and the method may further include determining whether the VM should be reactivated based on a number of replies and/or on an importance associated with at least one of the received replies.

According to further embodiments, the at least one active thread may be associated with a registered thread list, and pausing the VM may include comparing the received wait message to the registered thread list. The wait message may include a time when the external API call is performed, a technique to recognize the reply to the external API call, and/or a maximum time to wait before reactivating the VM. The technique to recognize the reply may include an origin address, reply content, and/or meta-data described in the wait message. In some embodiments, pausing the VM may include idling the VM or deactivating the VM.

According to other examples, a virtual machine manager (VMM) for pausing a virtual machine (VM) using application programming interface (API) signaling in a datacenter may include an external API detection module and a processing module. The external API detection module may be configured to receive a reply to an external API call performed by at least one active thread in the VM. The processing module may be configured to receive a wait message from the at least one active thread in the VM, pause the VM based on the received wait message, and determine whether the VM should be reactivated based on the reply.

According to some embodiments, the external API call and the reply to the external API call may be made to and received from a remote datacenter. The processing module may be further configured to switch to another VM when the VM is paused, switch from the other VM if the VM is reactivated, and/or pause the other VM if the VM is reactivated.

According to other embodiments, the processing module may be further configured to receive wait messages from multiple active threads in the VM and pause the VM based on the multiple received wait messages. The wait messages may be received from all active threads in the VM or a pre-specified number of active threads in the VM. The external API detection module may be further configured to receive replies to multiple external API calls performed by multiple active threads in the VM and the processing module may be further configured to determine if the VM should be reactivated based on the replies. The external API detection module may be further configured to receive replies to all or a pre-specified number of external API calls performed by the multiple active threads in the VM, and the processing module may be further configured to determine whether the VM should be reactivated based on a number of replies and/or on an importance associated with at least one of the received replies.

According to further embodiments, the at least one active thread may be associated with a registered thread list, and the processing module may be further configured to pause the VM by comparing the received wait message to the registered thread list. The wait message may include a time when the external API call is performed, a technique to recognize the reply to the external API call, and/or a maximum time to wait before reactivating the VM. The technique to recognize the reply may include an origin address, reply content, and/or meta-data described in the wait message. In some embodiments, the processing module may be further configured to pause the VM by idling the VM or deactivating the VM.

According to further examples, a cloud-based datacenter configured to pause a virtual machine (VM) using application programming interface (API) signaling may include at least one VM operable to be executed on one or more physical machines and a datacenter controller. The datacenter controller may be configured to receive a wait message from at least one active thread in the VM performing an external API call, pause the VM based on the received wait message, receive a reply to the external API call, and determine whether the VM should be reactivated based on the reply.

According to some embodiments, the external API call and the reply to the external API call may be made to and received from a remote datacenter. The controller may be further configured to switch to another VM operable to be executed on the one or more physical machines when the VM is paused, switch from the other VM if the VM is reactivated, and/or pause the other VM if the VM is reactivated.

According to other embodiments, the controller may be further configured to receive wait messages from multiple active threads in the VM and pause the VM based on the multiple received wait messages. The wait messages may be received from all active threads in the VM or a pre-specified number of active threads in the VM. The controller may be further configured to receive replies to multiple external API calls performed by multiple active threads in the VM and determine if the VM should be reactivated based on the replies. The controller may be further configured to receive replies to all or a pre-specified number of external API calls performed by the multiple active threads in the VM and/or determine whether the VM should be reactivated based on a number of replies and/or on an importance associated with at least one of the received replies.

According to further embodiments, the at least one active thread may be associated with a registered thread list, and the controller may be further configured to pause the VM by comparing the received wait message to the registered thread list. The wait message may include a time when the external API call is performed, a technique to recognize the reply to the external API call, and/or a maximum time to wait before reactivating the VM. The technique to recognize the reply may include an origin address, reply content, and/or meta-data described in the wait message. In some embodiments, the controller may be further configured to pause the VM by idling the VM or deactivating the VM.

According to yet further examples, a computer readable storage medium may store instructions for pausing a virtual machine (VM) using application programming interface (API) signaling. The instructions may include receiving a wait message from at least one active thread in the VM performing an external API call, pausing the VM based on the received wait message, receiving a reply to the external API call, and determining whether the VM should be reactivated based on the reply.

According to some embodiments, the instructions may further include receiving the reply to the external API call from a remote datacenter. The instructions may further include switching to another VM when the VM is paused, switching from the other VM responsive to a determination that the VM should be reactivated, and/or pausing the other VM if the VM is reactivated.

According to other embodiments, the instructions may further include receiving wait messages from multiple active threads in the VM and pausing the VM based on the multiple received wait messages. The wait messages may be received from all active threads in the VM or a pre-specified number of active threads in the VM. The instructions may further include receiving replies to multiple external API calls performed by multiple active threads in the VM and determining if the VM should be reactivated based on the replies. Replies to all or a pre-specified number of external API calls performed by the multiple active threads in the VM may be received, and the instructions may further include determining whether the VM should be reactivated based on a number of replies and/or on an importance associated with at least one of the received replies.

According to further embodiments, the at least one active thread may be associated with a registered thread list, and pausing the VM may include comparing the received wait message to the registered thread list. The wait message may include a time when the external API call is performed, a technique to recognize the reply to the external API call, and/or a maximum time to wait before reactivating the VM. The technique to recognize the reply may include an origin address, reply content, and/or meta-data described in the wait message. In some embodiments, pausing the VM may include idling the VM or deactivating the VM.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to pause a virtual machine (VM) using application programming interface (API) signaling at a datacenter, the method comprising:
    receiving a wait message from at least one thread of a plurality of threads in the VM, wherein the at least one thread performs an external API call;
    pausing the VM based on the received wait message;
    switching to another VM when the VM is paused;
    receiving a reply to the external API call performed by the thread and one or more replies to other external API calls performed by other threads of the plurality of threads in the VM;
    determining whether the VM is to remain paused or be reactivated based on a particular number of the plurality of threads with received replies and a binary importance value associated with each of the plurality of threads with received replies, wherein:
        the VM is to remain paused when a number of the plurality of threads with received replies is below the particular number and the binary importance value associated with each of the plurality of threads with received replies indicates non-importance, and
        the VM is to be reactivated when a number of the plurality of threads with received replies is below the particular number and at least one binary importance value associated with each of the plurality of threads with received replies indicates importance;
    switching from the other VM to the VM responsive to a determination that the VM be reactivated; and
    pausing the other VM if the VM is reactivated, wherein the pausing the other VM includes one from a set of idling the VM and deactivating the VW.

2. The method of claim 1, further comprising receiving the reply to the external API call performed by the at least one thread and the one or more replies to other external API calls performed by the other threads from a remote datacenter.

3. The method of claim 1, wherein receiving the wait messages includes one of:
    receiving wait messages from the plurality of threads in the VM; and
    receiving wait messages from a pre-specified number of the plurality of threads in the VM.

4. The method of claim 1, wherein the at least one thread is associated with a registered thread list and pausing the VM includes comparing the received wait message to the registered thread list.

5. The method of claim 1, wherein the wait message includes at least one of:
    a time when the external API call is performed;
    a technique to recognize the reply to the external API call; and
    a maximum time to wait before reactivating the VM.

6. The method of claim 5, wherein the technique to recognize the reply includes at least one of an origin address, reply content, and meta-data described in the wait message.

7. A server to pause a virtual machine (VM) using application programming interface (API) signaling in a datacenter, the server comprising:
    the VM that is being executed on the server;
    an external API detection module configured to receive replies to an external API call performed by a plurality of threads in the VM, wherein the external API call and the replies to the external API call are made to and received from a remote datacenter;
    a processor configured to:
        receive a wait message from at least one thread of the plurality of threads in the VM;
        compare the received wait message with a registered thread list to determine whether the VM and the at least one thread participate in VM pausing, wherein the registered thread list comprises each thread of the plurality of threads in the VM that have been registered to participate in VM pausing by one of a user and the processor;
        pause the VM based on the received wait message responsive to a determination that the VM and the at least one thread participate in VM pausing;
        receive the replies to the external API call performed by the plurality of threads in the VM; and
        determine if the VM should be reactivated based on a particular number of the plurality of threads with received replies and a binary importance value associated with each of the plurality of threads with received replies, wherein:
            the VM is to remain paused when a number of the plurality of threads with received replies is below the particular number and the binary importance value associated with each of the plurality of threads with received replies indicates non-importance, and
            the VM is to be reactivated when a number of the plurality of threads with received replies is below the particular number and at least one binary importance value associated with each of the plurality of threads with received replies indicates importance.

8. The server of claim 7, wherein the processor is further configured to switch to another VM when the VM is paused.

9. The server of claim 7, wherein the processor is further configured to:
    receive wait messages from the plurality of threads in the VM; and
    receive wait messages from a pre-specified number of the plurality of threads in the VM.

10. The server of claim 7, wherein the wait message includes at least one of:
    a time when the external API call is performed;
    a technique to recognize the reply to the external API call; and
    a maximum time to wait before reactivating the VM.

11. The server of claim 10, wherein the technique to recognize the reply includes at least one of an origin address, reply content, and meta-data described in the wait message.

12. The server of claim 7, wherein the processor is configured to pause the VM by one from a set of idling the VM and deactivating the VM.

13. A cloud-based datacenter configured to pause a virtual machine (VM) using application programming interface (API) signaling, the datacenter comprising:
at least one VM that is being executed on a server; and
a processor of the server configured to:
receive a wait message from at least one thread of a plurality of threads in the VM, wherein the at least one thread performs an external API call;
compare the received wait message with a registered thread list to determine whether the VM and the at least one thread participate in VM pausing, wherein the registered thread list comprises each thread of the plurality of threads in the VM that have been registered to participate in VM pausing by one of a user and the processor;
pause the VM based on the received wait message responsive to a determination that the VM and the at least one thread participate in VM pausing;
receive a reply to the external API call performed by the at least one thread and one or more replies to external API calls performed by other threads of the plurality of threads in the VM; and
determine if the VM should be reactivated based on a particular number of the plurality of threads with received replies and a binary importance value associated with each of the plurality of threads with received replies, wherein:
the VM is to remain paused when a number of the plurality of threads with received replies is below the particular number and the binary importance value associated with each of the plurality of threads with received replies indicates non-importance, and
the VM is to be reactivated when a number of the plurality of threads with received replies is below the particular number and at least one binary importance value associated with each of the plurality of threads with received replies indicates importance.

14. The datacenter of claim 13, wherein the external API call and the reply to the external API call are made to and received from a remote datacenter.

15. The datacenter of claim 13, wherein the processor is further configured to:
receive wait messages from each of the plurality of threads in the VM; and
receive wait messages from a pre-specified number of the plurality of threads in the VM.

16. The datacenter of claim 13, wherein the wait message includes at least one of:
a time when the external API call is performed;
a technique to recognize the reply to the external API call; and
a maximum time to wait before reactivating the VM.

17. The datacenter of claim 16, wherein the technique to recognize the reply includes at least one of an origin address, reply content, and mega-data. described in the wait message.

18. The datacenter of claim 13, wherein the processor is configured to pause the VM by one from a set of idling the VM and deactivating the VM.

* * * * *

UNITED STATES PATENT AND TRADEMARK OFFICE
CERTIFICATE OF CORRECTION

PATENT NO. : 9,298,502 B2
APPLICATION NO. : 14/110132
DATED : March 29, 2016
INVENTOR(S) : Kruglick It is certified that error appears in the above-identified patent and that said Letters Patent is hereby corrected as shown below:

Specification

In Column 1, Lines 7-8, delete "35 U.S. §371" and insert -- 35 U.S.C. § 371 --, therefor.

In Column 7, Line 47, delete "AN ports" and insert -- A/V ports --, therefor.

In Column 14, Line 67, delete "thereof" and insert -- thereof. --, therefor.

Claims

In Column 15, Line 53, in Claim 1, delete "VW." and insert -- VM. --, therefor.

In Column 18, Line 28, in Claim 17, delete "mega-data." and insert -- meta data --, therefor.

Signed and Sealed this
Twenty-eighth Day of June, 2016

Michelle K. Lee
*Director of the United States Patent and Trademark Office*